United States Patent [19]

Horna

[11] 4,064,379
[45] Dec. 20, 1977

[54] LOGARITHMIC ECHO CANCELLER

[75] Inventor: Otakar Anthony Horna, Bethesda, Md.

[73] Assignee: Communications Satellite Corporation, Washington, D.C.

[21] Appl. No.: 694,878

[22] Filed: June 11, 1976

[51] Int. Cl.$^2$ ............................................. H04B 3/20
[52] U.S. Cl. ................................................. 179/170.2
[58] Field of Search ................. 179/170.2, 170.6, 170.8

[56] References Cited

U.S. PATENT DOCUMENTS

| 3,877,026 | 4/1975 | Wintz et al. | 340/347 DA |
| 3,894,200 | 7/1975 | Campanella et al. | 179/170.2 |
| 3,905,028 | 9/1975 | Wintz et al. | 340/347 AD |

OTHER PUBLICATIONS

E. Fariello, "A Digital Echo Suppressor for Satellite Circuits", IEEE Transactions on Communications, Dec. 1972, pp. 1176–1181.

Primary Examiner—Kathleen H. Claffy
Assistant Examiner—Randall P. Myers
Attorney, Agent, or Firm—Sughrue, Rothwell, Mion, Zinn and Macpeak

[57] ABSTRACT

A logarithmic echo canceller is disclosed which simplifies the hardware of the canceller by (a) using a logarithmic format for both the sampled voice signal $x_i$ and the coefficient $h_i$, (b) using sophisticated algorithms for performing the different computational tasks, and (c) using analog techniques for echo subtraction and error signal generation. The incoming signal is sampled in a sample and hold circuit. The sign of the sampled input signal is sensed and its absolute value is converted directly in a special analog-to-digital converter into an A-law companding code. The whole digitized sample $x_i$ is multiplexed and stored in a plurality of shift registers. An average or pseudo rms value of the samples is computed, and the samples are compared in a comparator with the stored average or pseudo rms value, and if the sample is greater than the average or pseudo rms value, a signal enables updating of the existing value of $h_i$ stored in the H-register. The average or pseudo rms value of the incoming signal is also converted in a digital-to-analog converter to a reference voltage used to bias an analog center clipper and the error detector or comparator. A bandpass filter, pre-emphasis circuit and a low pass filter with de-emphasis circuit reduce the harmonic distortion caused by the center clipper. The sample $x_i$ and $h_i$ stored in the X-register and H-register are fed into a multiplier. In order that the A-law encoded $x_i$ and $h_i$ values may be used directly without further A-law/logarithmic conversion, the multiplication is performed in three different ways. In the case when both exponents are non-zero, addition of exponents and mantissas in two adders takes place. When both exponents are zero, the mantissas are directly multiplied. When one of the exponents is non-zero and the other is zero, both mantissas are directly multiplied in a multiplier, and the result is shifted in a shift register according to the value of the exponent. The result of the multiplication is then added to or subtracted from the contents of an accumulator. The output of the accumulator is converted in a digital-to-analog converter into an analog voltage which is subtracted in a differential amplifier from the echo signal which is present in the send out branch of the two-wire to four-wire hybrid.

12 Claims, 7 Drawing Figures

LOGARITHMIC ECHO CANCELLER

BACKGROUND OF THE INVENTION

The present invention is in the field of echo cancellers and in particular is an improved echo canceller using a logarithmic format to simplify the hardware of the canceller.

It is well known that hybrid circuits connecting two-wire to four-wire circuits in long distance communications networks do not provide echo free coupling between the send and receive lines of the four-wire circuit. A portion of the signal on the received line will pass to the send line and appear as a echo signal. When the four-wire system is used for very long distance communication, the echo signal can be particularly disturbing.

For round trip delays ($t_{RD}$) encountered, e.g., in east-to-west coast connections ($t_{RD} \approx 70$ ms) or satellite communications ($t_{RD} \approx 500$ ms), an additional echo suppressing and/or cancelling device becomes a necessity for commercial use. Therefore, in the last 45 years considerable research and development effort has been spent on designing the so-called echo suppressors. The echo suppressors are relatively simple electromechanical or electronic voice activated switches which disconnect the echo path according to the direction of the signal in the 4-wire section.

In spite of great improvements in echo suppression technique and technology, these devices can fail to provide adequate quality for 2-way communication mainly under the following adverse conditions:

a. when both parties are trying to talk simultaneously, i.e., during the so-called double talk period;

b. when there is a substantial difference in the sent-out signal level between the two communicating telephone sets assuming nominal loss in the circuit otherwise;

c. when the echo return loss is less than 9dB. All of these conditions increase their adverse effects with increasing round trip delay, not only because of the long propagation time between communicating parties but also because the long round trip delay connection usually interconnects two telephone networks built and maintained by different standards where the average echo return loss $\mu_{HL}$ and standard deviation of this loss $\sigma_{HL}$ have different, usually less favorable, values than U.S. networks.

In order to overcome these problems, an "echo canceller" was originally suggested by J. L. Kelly, Jr., and the implementation of this idea is described in an article by M. J. Sondhi, "An Adaptive Echo Canceller", *Bell System Technical Journal*, Volume 46, No. 3, March 1967, pp. 497 to 511. This particular design uses an analog technique, in other words, an analog delay line develops a replica of the echo signal which is then subtracted from the received signal. However, analog delay lines are difficult to implement where roudtrip delays of several tens of milliseconds are involved.

The problem associated with the analog techniques were overcome by the so-called digital "echo canceller" using digital techniques inside the operational loop. This design was described in an article by S. J. Campanella et al, "Analysis of an Adaptive Impulse Response Echo Canceller", *COSMAT Technical Review*, Volume 2, No. 1, Spring 1972, pp. 1 to 38. While the basic approach of the digital echo canceller is sound, it is a highly complex and very expensive system. The principle reason for the complexity and high cost of the digital echo canceller is the broad dynamic range of the speech and the long roundtrip delay $2t_E$ between the hybrid and the echo cancelling device. For acceptable results with different levels of signals, the speech must be sampled, quantized and processed with 11 to 12 bits of precision. The delay of echo $2t_E$ in some telephone networks can be as long as 50 milliseconds. With 8KHz sampling rates, the digital echo canceller must therefore be able to store 1K to 2K bytes and process these bytes in parallel with a clock rate greater than 3MHz. As a result, the digital echo canceller is nearly two orders of magnitude more complicated (and expensive) than the most sophisticated echo suppressor.

SUMMARY OF THE INVENTION

It is therefore an object of the present invention to simplify the hardware required in echo cancellers while at the same time retaining the advantages of the digital approach.

It is more specifically an object of the invention to redesign the digital echo canceller so that its complexity, size and cost are at least comparable to those of echo suppressors.

These and other objects of the invention are achieved by:

a. The signal in receive and send paths is processed analogically in order not to restrain the choice of the canceller's internal digital code.

b. The speech and pulse response samples are encoded in pseudologarithmic format in order to save memory space. An analog-to-digital converter for direct conversion in nonlinear code is used.

c. The multiplication in the convolution processor is performed as an addition of the logarithms (base 2) of speech and impulse response samples.

d. In the cross-correlation processor, the impulse response is updated by multiplication by a constant instead of by addition of an increment. This fast converging algorithm simplifies the design of the error detector and makes the canceller less sensitive to "phase roll" and difficult "double talk" condition.

e. The cross-correlator's feedback loop is stablized by nonlinear damping and by adapting the sensitivity of the error detector to varying signal conditions.

f. The residual echo signal is removed by a continuously adaptive center clipper with distortion reduced below the detectable level.

g. The difficult problem of the digital-to-analog cross-talk is solved by dividing every convolution cycle into analog and digital periods.

More specifically, the speech samples $x_i$ are encoded in a quasi-logarithmic format. The 7-digit A-law encoding is chosen. A description of the A-law encoding is provided on pages 579 to 583 of *Transmissions Systems for Communications*, Fourth Edition, published by Bell Telephone Laboratories, Inc., February 1970. This digital format gives an adequate signal-to-noise ratio (better than 30dB) in a dynamic range of 40dB and saves approximately 35 percent of the X-register size in comparison to an 11-bit linear code necessary for the same signal-to-noise ratio. The H-register word is stored also in a quasi-logarithmic format with a 3-bit exponent and a 4-bit mantissa. With the sign bit, the $h_i$ word is 8-bits long, which represents a 27 percent reduction of H-register size. The greatest hardware saving, however, is achieved in the multiplier design. Because both $x_i$ words and $h_i$ words are in the logarithmic format, the multiplication $x_i$. $h_i$ is performed as the addition of $\log_2(x_i) + \log_2(h_i)$. The large 11-bit by 11-bit parallel multiplier normally used in digital echo cancellers is thus replaced by an adder. New algorithms are used for the computation of an average or pseudo rms value of speech samples $x_i$ stored in the X-register. In one embodiment, an average value is computed; however, instead of adding all absolute values of the stored samples $x_i$ every sampling period, the oldest sample is subtracted and then a new sample $|x_{i+n+1}|$ is used to update the existing contents of the average value memory. Thus, the number of additions in every sampling period is reduced making it possible to use relatively simple circuitry. Alternatively, a pseudo rms value is generated by adding only the absolute value of samples $|x_{i+j}|$ which are greater than a certain threshold to the contents of a pseudo rms memory. In this manner, the number of bits in the rms processor is reduced, and the parallel 16-bit adder-accumulator normally used for this purpose in digital echo cancellers can be replaced by a simple adder and overflow counter.

Analog subtraction of simulated (i.e., computed) echo is used in the return path, and also analog comparators are used for $\Delta h$ correction instead of digital circuits. With inexpensive integrated circuit operational amplifiers and comparators, this technique not only simplifies the circuit by eliminating one analog-to-digital converter and one digital-to-analog converter in the canceller, but also eliminates quantization noise and distortion in the return signal path. The digital signal is used only inside the echo canceller processor and does not need to be in compliance with different voice channels standards as, for example, A-law which is standardized by C.C.I.R. while another companding characteristic, the so-called $\mu$-law, has been chosen by the Bell System.

The efficiency of the echo canceller can be substantially improved by the use of a so-called adaptive center clipper in the return path. By using the adaptive center clipper and a pre-emphasis and de-emphasis technique, the distortion introduced by the center clipper can be substantially reduced. A simple hybrid analog-digital circuit permits automatic adjustment of the clipping level to the optimum value in accordance with the echo producing signal level.

BRIEF DESCRIPTION OF THE DRAWINGS

The specific nature of the invention, as well as other objects, aspects, uses and advantages thereof will clearly appear from the following description and from the accompanying drawing in which.

DESCRIPTION OF THE PREFERRED EMBODIMENTS

Figure 1:
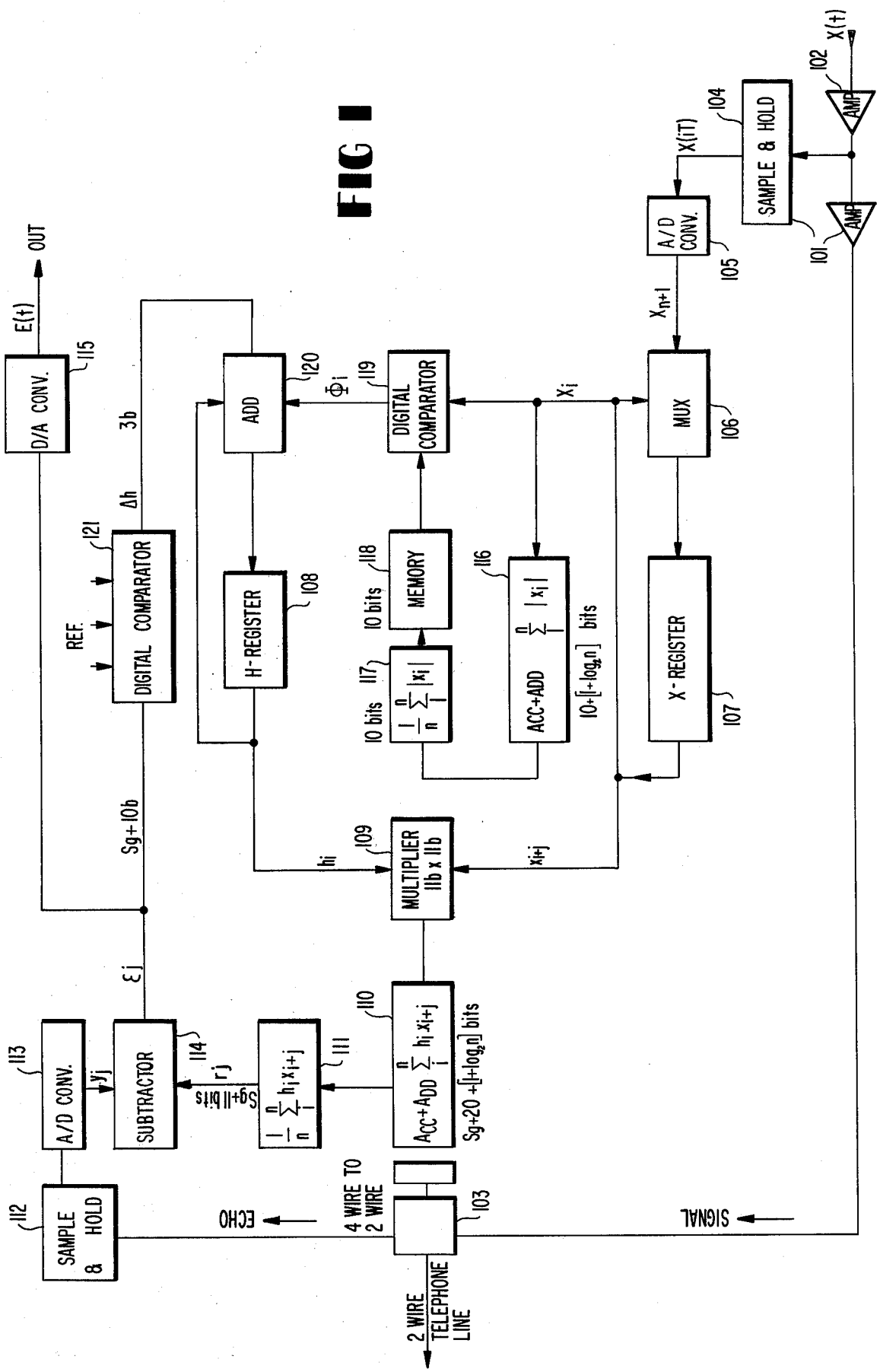
FIG. 1 is a system diagram of the present state of the art of digital echo cancellers.

Referring first to FIG. 1 which illustrates the present state of the art of hardware implementation in digital echo cancellers, the incoming telephone signal $X(t)$ is amplified in a switched compressor amplifier 102 in order to adjust the signal level and protect the system from overloading. The output of amplifier 102 is applied on the one hand via blocking amplifier 101 to the input of 4-wire to 2-wire hybrid 103, and on the other hand to the input of sample and hold circuit 104. The output of the sample and hold circuit 104 $X(iT)$ is converted into an 11-bit digital code by the analog-to-digital converter 105. The 11-bit code includes one sign bit and 10 bits of amplitude. The 11-bit conversion is necessary to cover the 40dB dynamic range of the input telephone signal with acceptable signal to quantization noise ratio. The digital sample $X_{n+1}$ is multiplexed in a multiplexer 106 and then retained in the X-register 107. The X-register must be able to store $n \times 11$-bits, where $n$ is a function of the expected delay of the telephone circuit and of the sampling frequency of the sample and hold circuit 104. Usually the number $n$ is in the range of $100 < n < 500$ for 8kHz (125 $\mu$s) sampling rate. As it has been explained in the article by S. J. Campanella et al, supra, every 11-bit sample must be multiplied by one of the $h$ coefficients stored in the H-register 108 during every sampling period. For this purpose, a parallel multiplier 109 capable of multiplying 11-bits by 11-bits must be used.

The products $h_i \cdot x_{i+j}$ are added with the proper sign in the accumulator 110 which must have a capacity of at least $20 + [1 + \log_2 n]$ bits. The sum of the products is then divided by $n$, and another 11-bit word representing the predicted echo sample is stored in the register 111. The multiplier 109 and the accumulator 110 form the convolution processor of the digital echo canceller. The echo signal is also sampled in the sample and hold circuit 112 which is connected to an output of the 4-wire to 2-wire hybrid 103. The echo signal sampled by the sample and hold circuit 112 is converted to an 11-bit digital code in the analog-to-digital converter 113, and this 11-bit code is subtracted in the subtractor 114 from the predicted echo sample from register 111. The difference $\epsilon_j$ is converted to an analog signal $E(t)$ by the digital-to-analog coverter 115 to drive the return line by an analog voice signal.

By digital cross-correlation techniques, the contents of the H-register 108 are continuously updated. The absolute values of the digital signal from the analog-to-digital converter 105 via the multiplexer 106 are added to the contents of the accumulator 116 which must have a capacity of $10 + [1 + \log_2 n[$ bits. This sum is divided by $n$ in the divider 117, and this average value of the $n$ samples of the signal $X(t)$ is stored in a 10-bit memory 118. Every sample in the X-register 107 is compared in a digital comparator 119 against the average value stored in the memory 118, and from the process a binary correction signal $\phi_i$ is determined. This signal commands the continuous updating process of the contents of the H-register 108 by adding or subtracting in adder/subtractor 120 a 3-bit signal $\Delta h$ to different coefficients $h_i$. The $\Delta h$ signal is generated in an 11-bit digital comparator 121 which receives the output $\epsilon_j$ of subtractor 114.

The theory of the operation of the digital echo canceller will now be described. The H-register 108 stores $n$ samples, $h_i$, of the unit impulses echo response in digital form. The X-register 107 stores $n$ recent speech samples, $x_{i+j}$, from the analog-to-digital converter 105. During the jth sampling period the jth estimate of the echo $r_j$ is computed in the convolution processor:

$$r_j = \sum_{i=0}^{m} h_i \cdot x_{i+j} = h(j)*x(j) \tag{1}$$

This estimate is subtracted from the true echo $y_j$, and at the output of the subtractor 114 there is an error signal, i.e., a residual echo, $$\epsilon_j = y_j - r_j \tag{2}$$

The residual echo $\epsilon_j$ is detected and nonlinearly quantized into $Q(\epsilon_j)$; a correction $\Delta h_{i,j}$ for every sample $h_i$ is computed by using a modified Widrow-Hoff least mean-square (LMS) algorithm:

$$\Delta h_{i,j} = Q(\epsilon_j) f\left|\frac{x_{i+j}}{X_j}\right| = Q(\epsilon_j) \, Sg(x_{i+j})\phi_{i+j} \tag{3}$$

where $\phi_{i+j} = 0$ for $|x_{i+j}| < X_j$ $\phi_{i+j} = 1$ for $|x_{i+j}| > X_j$ $Sg(x_{i+j})$ is the sign of the $x_{i+j}$ and $X_j$ is a quantity proportional to the rms value of the $n$ recent speech signal samples:

$$X_j \approx \sqrt{\frac{1}{n} \sum_{i=0}^{n} x_{i+j}^2} \tag{4}$$

The correction $\Delta h_{i,j}$ is added with the proper sign to every corresponding sample $h_i$ so that its new value is $$h_i' = h_i + \Delta h_{i,j} \tag{5}$$

These updated values of $h_i'$ as used to compute the next $(j+1)$th estimate $r_{j+1}$ for a new set of $x_{i+j+1}$ samples of speech. The new error value $\epsilon_{j+1}$ is then used to compute another set of corrections $\Delta h_{i,j+1}$. By using this simple interactive correlation process, the impulse response is built up in the H-register and continuously updated when changes occur. Campanella et al and Widrow have shown that this algorithm is convergent, i.e., $\epsilon_j \to 0$ by the method of steepest descent, and they have derived the stability criteria of this process.

Under the worst case condition, i.e., for the "hydrid's" echo return loss < 5 dB, the digital echo canceller must attenuate the incoming echo signal $y_j$ by more then 26 dB to achieve the required loss, $\mu_{RL} \geq 30$ dB. This means that the relative value of error signal according to Equation (2) must be $$\frac{|\epsilon_j|}{|y_j|} = \frac{|y_j - r_j|}{|y_j|} \leq 0.05 < 2^{-4} \tag{6}$$

Both $h_i$ and $x_{i+j}$ samples must therefore be quantized with $\geq$ 6-bit precision. However, the dynamic range of the speech is about 40 dB and the amplitude range of the impulse response is the same as the possible range of echo return loss, i.e., > 24 dB. Therefore, to obtain the required echo attentuation in the whole dynamic range, the quantization of speech samples $x_{i+j}$ must be 12-bits, and the quantization of impulse response samples $h_i$ must be at least 9-bits.

The delay $t_E$ in the 4-wire section between the hydrid and the echo canceller is usually in the range of $0 < t_E \leq 16$ ms; the impulse response can therefore be delayed as much as $2t_E = 32$ ms. For telephone speech, a sample period $T_S \geq 125$ μs must be used. To cover the possible range of delays at least $n$ samples, where $$n \geq \frac{2t_E}{T_S} = \frac{32000}{125} = 256 \tag{7}$$

must be stored in the H- and X-registers, i.e., 256 × (12+9) = 5376 bits.

To compute the echo estimate $r_j$ according to Equation (1), 256 multiplications and 256 additions of those products must therefore be performed during every sampling period $T_S = 125$ μs. This requires parallel processing in the multiplier which represents (with the memories) the greatest part of the hardware and therefore the cost of the digital echo canceller.

In the present invention, the following steps have been taken to reduce the hardware complexity:

a. In both the receive- and send-paths the signals are processed analogically; then the choice of an internal digital code for the digital echo canceller is not limited by any communications network standards.

b. The speech samples $x_{i+j}$ are encoded in the 13-segment pseudo-logarithmic 7-bit format (A-law) which has the same minimum resolution and dynamic range as an 11-bit linear code. The impulse response samples $h_i$ are encoded in a similar 11-segment format by 8-bits, which is equivalent to a 10-bit linear code. This coding saves more than 28 percent of the memory space.

c. With both samples $x_{i+j}$ and $h_i$ in a logarithmic format, the multiplication of $x_{i+j} \cdot h_i$ in the convolution processor (see Equation 1) is performed as an addition of the logarithms of $x_{i+j}$ and $h_i$. Thus, the whole multiplication is performed by two 4-bit adders, a 512-bit ROM and a 4-bit multiplexer. This reduces the component count of the convolution processor to less than one-tenth.

d. The logarithmic code permits a simple implementation of a new fast adaptive cross-correlation algorithm. The existing impulse response samples $h_i$ are updated by multiplication by a constant <1 or >1, in constrast to what was done previously by addition of $\Delta h_{i,j}$ according to Equation (5), i.e., the Widrow-Hoff algorithm. The impulse response buildup time in the H-register is thus less dependent on the absolute value of samples $|h_i|$ than with all other algorithms.

e. The fast convergence makes the present design less sensitive to the so-called "phase-roll" in the echo path than echo cancellers using much more sophisticated and "expensive" cross-correlation algorithms. The performance is even comparable to that of devices using the so-called double convolution.

f. The rapid $h_i$ buildup time also simplifies the design of the double-talk detector because a partially distorted impulse response $h_i$ can be corrected in a few milliseconds, e.g., during the shortest period of "single talk". The affirmative "yeah" is usually sufficient to fully regenerate the distorted impulse response.

g. In one embodiment, a new algorithm is used for the computation of the averae value of speech samples $x_i$ stored in the X-register.

h. In an alternative embodiment, the pseudo-rms value $x_j$ of the stored speech samples is computed simply by counting the number of overflows of a 4-bit accumulator with carryout.

i. The value $X_j$ is also used as a reference voltage for the adaptive center clipper which further reduces the residual echo signal $\epsilon_j$ below the system noise level.

j. $X_j$ is also used as a reference in the error sensor to adjust its sensitivity. This and nonlinear "damping" by a digital "inert zone" have made it possible to increase the gain in the correlation feedback loop while retaining the utmost circuit simplicity.

k. Last, but not least, a careful study has been made to determine which operations are more effectively done digitally and which analogically and the methods have been chosen accordingly. Such a "hybrid" system is always sensitive to crosstalk between the digital part with pulses having amplitudes of several volts and between the analog part with millivolt signals. The sampling interval, $T_S = 125$ $\mu$s, is therefore time-shared; all digital operations are performed, for example, in the first 100 $\mu$s; then the clock is stopped and within the remaining 25 $\mu$s all analog processing takes place. This makes it possible for both parts of the system to work without interference and elaborate shielding.

In spite of all these simplifications, the digital echo canceller according to the invention, attenuates the echo signal by $\approx 22$ dB without the center clipper. With the center clipper, an additional attenuation of $>8$ dB is achieved; i.e., $$\frac{|\epsilon_j|}{|y_j|} = \frac{|y_j - r_j|}{|y_j|} < 0.03 \qquad (8)$$

(see Equation (6) for comparison). The convergence time of $\epsilon_j$ is always shorter than 250-ms. These properties are practically invariant over the dynamic range of $>28$ dB and under a "phaseroll" of 6 radians/s.

Figure 2:
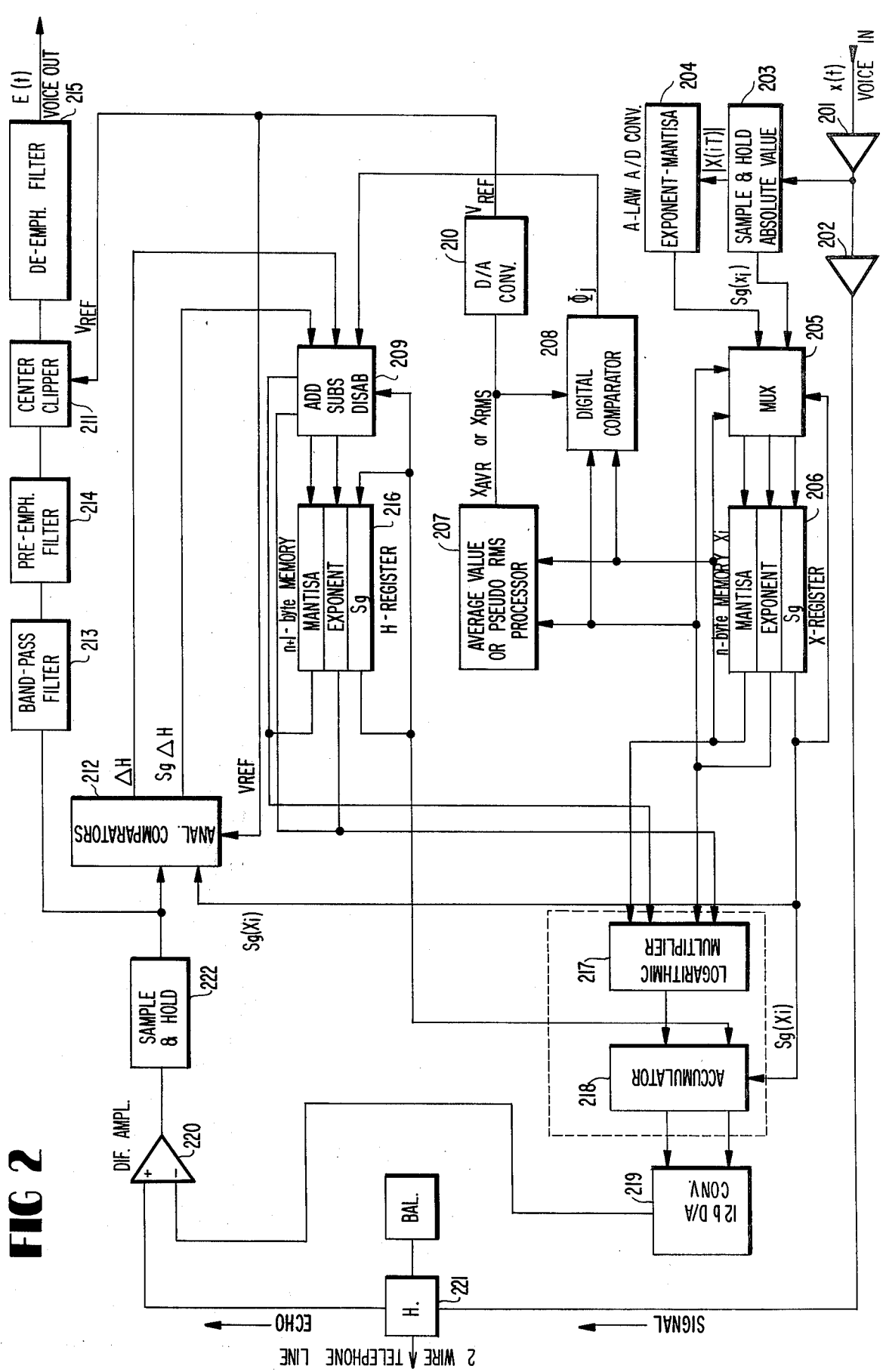
FIG. 2 is a system diagram of the logarithmic echo canceller according to the present invention.

The echo canceller according to the present invention is illustrated in FIG. 2 and represents a considerable savings in hardware while at the same time retaining the advantages of the digital echo canceller. The incoming voice signal is passed through an amplifier 201 with switched compressor which attenuates strong signals which can cause overload in the echo canceller processing loop. The blocking amplifier 202 assures unidirectivity of the signal as previously described.

The incoming signal is sampled in a sample and hold circuit 203. The sign of the signal $Sg(x_i)$ is sensed and the absolute value $|x(iT)|$ of the signal is converted directly in a special analog-to-digital converter 204 into a companded A-law signal with 3-bit exponent and 3-bit mantissa, corresponding to a 13 segment A-law curve. The A-law format has the advantage that it can be very simply converted to logarithms mod. 2 and to the linear 11-bit format. The whole digitized sample $x_i$ is multiplexed in multiplexer 205 and then stored in seven parallel connected n bit shift registers 206. These shift registers constitute the X-register. The register length $n$ must be $200 \leq n \leq 520$ bits long, the exact value of $n$ being a function of the expected delay $2t_E$ in the telephone circuit.

As in the digital echo canceller shown in FIG. 1, the latest samples are used to update the contents of the average value or pseudo rms value stored in processor 207. The contents of register 206 is compared with the value stored in processor 207 in a digital comparator 208 which generates a control signal $\phi_j$ to control adder/subtractor 209 in the impulse function correction process. This process will be described in more detail hereinafter. The value stored in processor 207 is also converted in a digital-to-analog converter 210 into a reference voltage used to bias the adaptive analog center clipper 211 and the analog comparator 212. A bandpass filter 213 and a pre-emphasis circuit 214 are connected in series at the input of the center clipper 211, while a de-emphasis circuit 215 is connected to the output of the adaptive center clipper 211. The bandpass filter 213, the pre-emphasis circuit 214, and the de-emphasis circuit 215 reduce the harmonic distortion caused by the center clipper 211 and linearize the frequency characteristic of the return path to a prescribed value.

The samples $x_i$ and $h_i$ stored in the X-register 206 and the H-register 216, respectively, are fed into a logarithmic multiplier 217. In order to use the A-law encoded $x_i$ and $h_i$ values directly without further A-law/linear conversion, the multiplication is performed in three different ways corresponding to the three possible conditions of the exponents as being zero or non-zero. When both exponents are zero, the mantissas are directly multiplied in a multiplier. In the case when both exponents are non-zero, addition of exponents $e$ and mantissas $m$ in two adders takes place and output of the mantissa adder is multiplied by $2^e$ in the multiplier. When one exponent is non-zero and the other exponent is zero, both mantissas are directly multiplied in the multiplier and the mantissa having the zero exponent is added to the partial product output of the multiplier. This rather complicated algorithm, which will be explained in more detail with reference to FIG. 3, makes it possible to implement the multiplier with a minimum number of commercially standard integrated circuits. The result $h_i \times x_{i+j}$ from logarithmic multiplier 217 is then added to or subtracted from the contents of a 20-bit accumulator 218. The multiplier and the accumulator together form the convolution processor for computing an estimate of the echo. Eleven most significant bits plus sign bits are then converted in a digital-to-analog converter 219 into an analog voltage which is subtracted in a differential amplifier 220 from the echo signal at the output branch of the 4-wire to 2-wire hybrid 221.

The analog difference voltage from the differential amplifier 220 is sampled in sample and hold circuit 222, and this difference voltage is compared against the reference $V_{REF}$ by a group of analog comparators 212. From the state of the digital output of of the analog comparators and from the sign $Sg(x_i)$ of the corresponding sample $x_i$, the sign $Sg(\Delta H)$ and the correction signal $\Delta H$ is determined. This digital signal is then fed to the adder/subtractor 209 where the value $\Delta H$ is added to or subtracted from, according to the sign $S_g(\Delta H)$, the mantissa of the $h_i$ values stored in the H-register 216. Because the H-register 216 is 1-bit longer $(n+1)$ than the X-register 206, after every cycle the relative position of $x_i$ samples and the $h_i$ values shifts when the "oldest" sample $x_i$ is replaced by the new sample $x_{i+n+1}$. This is necessary for computation of the next echo estimate supplied to the differential amplifier 220 by the digital-to-analog converter 226. This extra register stage also gives the necessary time to correct the stored impulse response before it enters the convolution processor.

The convolution processor will be described in more detail with reference to FIG. 3 of the drawings. During every sampling period $T_S = 125$ $\mu$s, the convolution processor computes the $j$th echo estimate $r_j$, which is, according to Equation (1), $$r_j = \sum_{i=0}^{n} h_i \cdot x_{i+j} = \sum_{i=0}^{n} P_i$$

Figure 3:
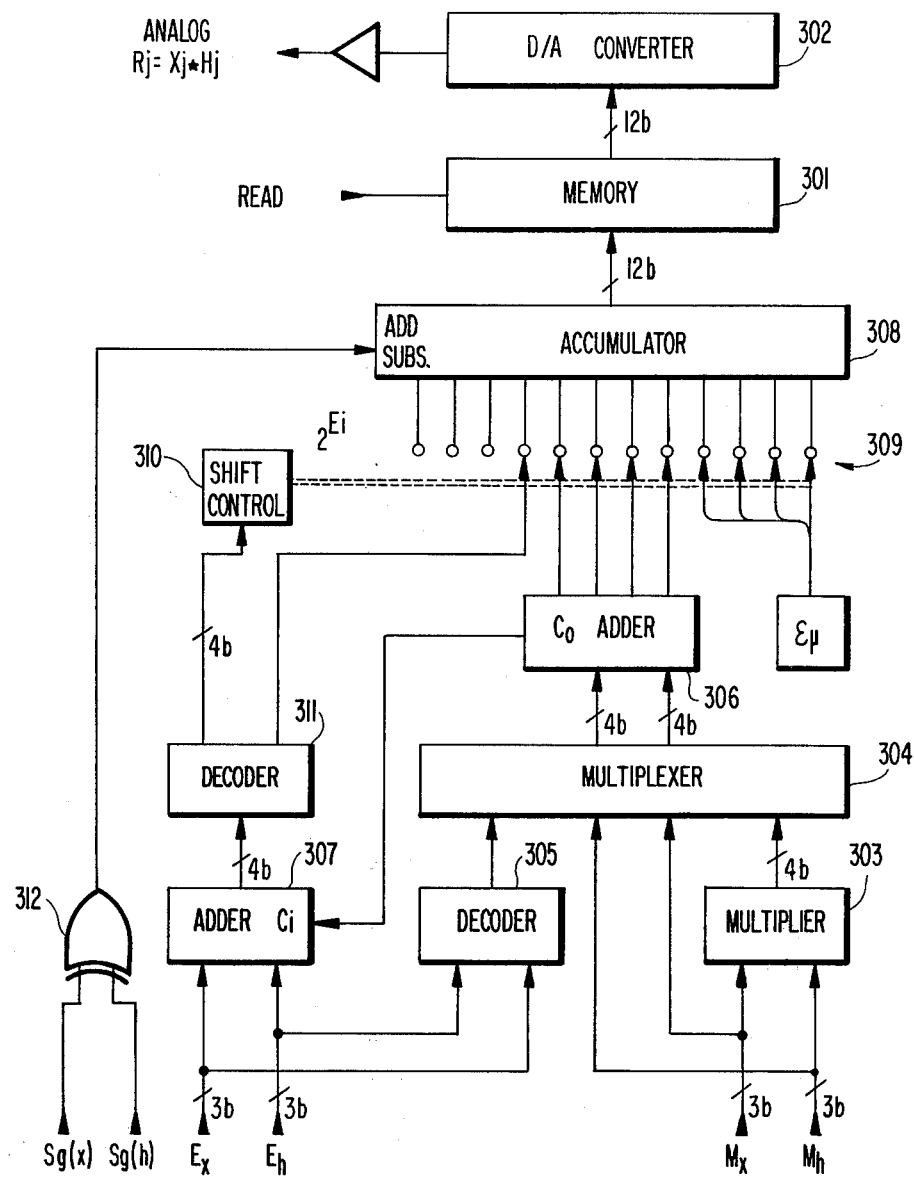
FIG. 3 is a block diagram of the convolution processor used in the system shown in FIG. 2.

That is, it accumulates $n$ products $P_i = h_i \cdot x_{i+j}$ of the samples stored in the X and H registers 206 and 217, respectively, and at the end of the cycle it stores $r_j$ in a register 301 which drives a digital-to-analog converter 302 as shown in FIG. 3. The analog value $r_j$ is then subtracted from the echo signal $y_j$ (see FIG. 2). Because both samples are in the A-law format, for zero exponents $e_x = e_h = 0$, their absolute value is $$\begin{vmatrix} x \\ h \end{vmatrix} = \begin{matrix} m_x \times 2 \times q_x = 2 \times m_x \\ m_h \times 2 \times q_h = 2 \times m_h \end{matrix} \quad (12)$$

where $q_x$ and $q_h$ are digital-to-analog scaling factors (quantization steps) which can be chosen as $q_x = q_h = 1$ to simplify the following considerations. For $e_x > 0$ and $e_h > 0$, the value of the sample is $$\begin{vmatrix} x \\ h \end{vmatrix} = \begin{matrix} 2^{e_x}(1 + m_x) \\ 2^{e_h}(1 + m_h) \end{matrix} \quad (13)$$

where by definition the mantissas are $m_x, m_h < 1$. There are therefore four possible combinations of sample formats entering the convolution processor's multiplier. Four different algorithms are used to form the product $P_i = x_{i+j} \cdot h_i$.

If $e_x = e_h = 0$ and the numbers $|x|$ and $|h|$ are only three bits wide (see Equation (12)), the product is $$|P_i| = 2^2 \times m_x \times m_h \quad (14)$$

The product $|P_i|$ at the output of multiplier 303 may be generated in a look-up table, i.e., in a $4 \times 2^6 = 256$-bit read only memory which is inexpensive and readily available.

If either $e_x = 0, e_h \geq 1$, or $e_x \geq 1, e_h = 0$, then the product $|P_i|$, for the latter case, is $$|P_i| = 2^{e_x} \cdot (1 + m_x) \cdot 2 \cdot m_h = 2^{e_x+1}(m_h + m_x \cdot m_h) \quad (15)$$

Also in this case the partial product $m_x \times m_h$ is read from the read only memory multiplier 303 and added to the mantissa which has the zero exponent. More specifically, the partial product is read out of multiplier 303 via multiplexer 304 under control of decoder 305 to adder 306. In addition, the mantissa which has the zero exponent is coupled via multiplexer 304 under control of decoder 305 to adder 306 to form the product $|P_i|$. The sum $m_h + m_x \cdot m_h$ is only $\leq 5$ bits wide and a simple 4-bit medium scale integrated circuit adder can be used in this operation.

If both $e_x \geq 1$ and $e_h \geq 1$, then the product $|P_i|$ is computed as $$\log_2 |P_i| = e_x + \log_2(1+m) + e_h \log_2(1+m) \quad (16)$$

(see Equation (13) for comparison). For $0 \leq m_x, m_h < 1$, these approximate expressions hold $$\log_2(1 + m) = m \quad (17)$$

$$2^m = 1 + m \quad (18)$$

Equation (16) can be simplified to yield $$\log_2 |P_i| = e_x + e_h + m_x + m_h = E_i + M_i \quad (19)$$

where the exponent $E_i$ is the whole part of the sum of Equation (19), i.e., $E_i = (e_x + e_h + m_x + m_h)$ and the mantissa $M_i$ is the remainder of Equation (19) or $M_i = e_x + e_h + m_x + m_h - E_i$. The product $|P_i|$ is then $$|P_i| = \text{antilog}_2(E_i + M_i) = 2^{E_i}(1 + M_i + \epsilon_M) \quad (20)$$

where $\epsilon_M$ is a correction which is a function of $m_x$ and $m_h$, i.e., $\epsilon_M = f(m_x, m_h)$ and always such that $\epsilon_M < 2^{-3}$, therefore smaller than the least significant bits of $m_x$ and $m_h$. Equations (19) and (20) can be implemented by two adders, adder 307 for the exponent and adder 306 for the mantissa.

Multiplication of the product of mantissas by $2^{E_i}$, where $E_i$ is an integer $E_i \in \{2, \ldots, 14\}$ (see Equations (14), (15) and (19)), is equivalent to shifting the partial products by $E_i$ binary places before entering the accumulator 308. This can be done by a read only memory or, as shown schematically in FIG. 3, a static shifter 309. The static shifter 309 is controlled by a shift control 310 which, in turn is responsive to the sum of the exponents as decoded in decoder 311. To complete the description of FIG. 3, a NOR gate 312 receives the sign bits $Sg(x)$ and $Sg(h)$ and controls the add/subtract mode of accumulator 308.

There are two main reasons for using this seemingly complicated multiplication scheme:

a. Speed: Under all conditions the multiplication is performed by reading from the read only memory 303 and performing a single addition, so that the whole operation of multiplying $x_{i+j} \cdot h_i$ and adding the product into the accumulator 308 can be done in one clock period $T_C$, even when transistor-transistor logic and the longest storage registers with $n = 512$ bits are used, i.e., when $T_C = 200$ ns.

b. Simplicity: The whole multiplier consists of a small read only memory for multiplier 303, two adders 306 and 307, and a few gates because all of the algorithms above are relatively easy to implement in hardware; e.g., the decoder 311 must only detect whether exponents $e = 0$ or $e \geq 1$, etc.

Referring back to FIG. 2, the cross-correlator will be discussed in more detail. The cross-correlator algorithm has already been described. According to Equation (3), the $h_i$ samples are corrected by addition of $\Delta h_{i,j}$ (see Equation (5)) if and only if the following conditions are met:

a. The error voltage $\epsilon_j$ is greater than a certain multiple of the basic quantization step.

b. The corresponding sample $|x_{i+j}|$ is greater than $X_j$ which is proportional to the rms value of samples stored in the X-register ($\phi_{i+j}$ function).

c. There are several other internal and/or external conditions inhibiting the correction process. (The most important is the "double talk condition" when both echo $y_j$ and a send-speech signal are present in the echo path.)

Every $h_i$ sample is also encoded into an 8-bit A-law format and stored in the H-register 216 as $Sg(h_i) + e_h + m_h$, where the most significant bit is sign $Sg(h_i)$ followed by a 3-bit exponent which is an integer $e_h \in \{0, \ldots, 6\}$ and a 4-bit mantissa $0 < m_h < 1$. The least significant bit, i.e., the fourth bit of $m_h$, i.e., $2^{-4}$, does not enter the convolution processor. Since it is used only in the cross-correlation process, as will now be described.

If $e_h = 0$, i.e., in the linear segment of the A-law code, the correlation formula is the same as that given by Equation (5), i.e., the Widrow-Hoff least mean square algorithm, $$h_i' = h_i + \Delta h_{i,j} = Sg(h_i) \cdot m_h = \Delta h_{i,j} \quad (21)$$

(see Equation (12). If $e_h \geq 1$ and $h_{i,j} < 1$, then according to Equation (17), the process of adding $\Delta h_{i,j}$ is according to Equation (17) approximately equivalent to $$e_h + m_h + \Delta h_{i,j} + e_h + \log_2(1 + m_h) + \log_2(1 + \Delta h_{i,j}) \quad (22)$$

The right-hand side of Equation (22) is, according to Equation (13), $$\log_2|h_i| + \log_2(1 + \Delta h_{i,j}) = \log_2|h_i'| \quad (23)$$

The corrected sample $h_i'$ is therefore the antilog of Equation (23); i.e., $$h_i' = h_i(1 + \Delta h_{i,j}) \quad (24)$$

The sample is thus multiplied by a multiplier $<1$ or $<1$ according to the sign of $\Delta h_{i,j}$. The time constant $\tau_{CR}$ is therefore independent of the amplitude of $h_i$ and is $$\tau_{CR} = 5 \times 2^{b_m - 3} T_S \quad (25)$$

where $b_m$ is the number of bits in the mantissa and $T_S$ is the sampling period, i.e., $T_S = 125$ μs. For a 4-bit mantissa $\tau_{CR} = 1.25$ ms.

Thus, $\tau_{CR}$ is more than one order of magnitude shorter than the time constant of a similar cross-correlator using Widrow-Hoff algorithm. The same is true of the convergence time $\tau_{CN}$, i.e., the time at which the echo return loss enhancement (ERLE) in the circuit reaches a point 1 dB below the steady state value of ERLE. This time is a function of the circuit echo return loss, the signal statistics and amplitude, etc., and can be determined only by experiment. This high-speed algorithm makes it possible to substantially simplify the cross-correlator:

a. Only two quantization levels are used for the error signal $\epsilon_j$.

$$Q(\epsilon_j) \epsilon \{+2^{-4}, 0, -2^{-4}\} \quad (26)$$

b. The correction $\Delta h_{i,j}$ therefore has only one fixed value $\Delta h_{i,j} = 2^{-4}$, which is equivalent to the least significant bit of the mantissa $m_h$.

c. The error sensor reference voltage $V_{REF}$ supplied to comparator 212 is dependent on $X_j$.

The detector is less sensitive in the presence of higher level receive-in signals and vice versa. This keeps the echo attenuation (> 23 dB) fairly independent of receive-in speech signal levels over dynamic range of more than 23 dB. With white noise, which as a different amplitude distribution than speech, the range is only 21 dB.

d. As described above, the correction $\Delta h_{i,j}$ is added to the least significant of $h_i$, i.e., to the fourth mantissa bit which does not enter the convolution processor's multiplier. This is analogous to the "inert zone" stabilization of nonlinear feedback control systems. This technique, along with that described in (c) holds the digital echo canceller's feedback loop stable even when its internal gain, i.e., the "hybrid's" return loss, changes by more than 24 dB.

e. Proper functioning of the digital echo cancellor with high return loss and low level receive-in signals is made possible by the high peaks contained in the speech signal. They have an amplitude >15 dB higher than the rms value during a syllabic period $T_{SP} = 125$ ms and can therefore activate the cross-correlator's error sensor even when the feedback loop's internal gain is low.

As previously described (see Equation (3)), the functions of the analog comparator 212, adder/subtractor 209, and the center clipper 211 are dependent on a quantity $X_j$ which is proportional to the average value or pseudo rms value of the speech samples stored in the X-register:

$$X_{AVR} = \frac{1}{n} \sum_{1}^{n} |x_i| \text{ or} \quad (27)$$

$$X_j = q_R \left( \frac{1}{n} \sum_{i=0}^{n} x_{i+j}^2 \right)^{\frac{1}{2}}$$

where $q_R$ is a proportionality constant. Because neither of the above mentioned functions of $X_{AVR}$ or $X_j$ requires higher precision, three simple approximations are used in computing $X_j$.

Figure 4:
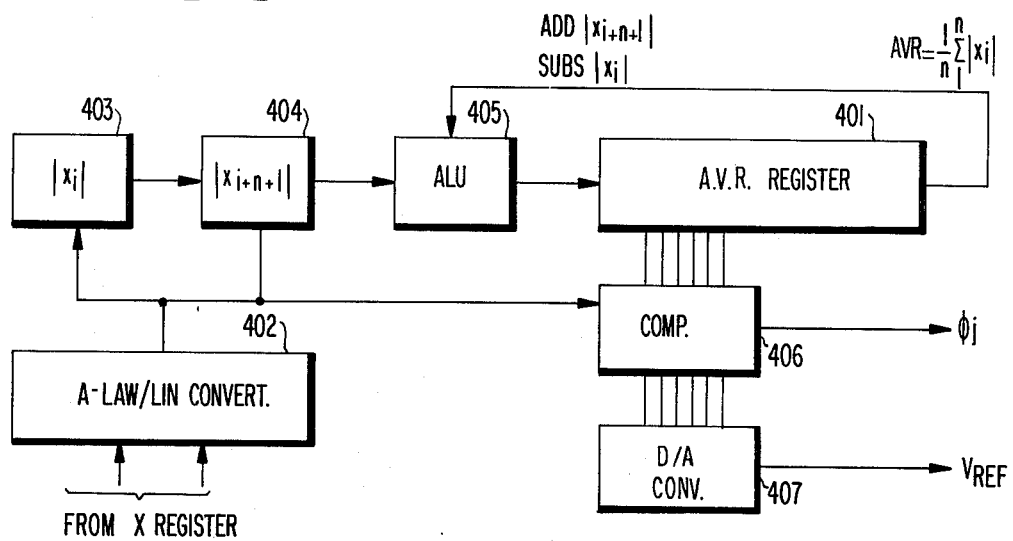
FIG. 4 is a block diagram of the average value processor which may be used in the cross-correlator of one embodiment of the system shown in FIG. 2.

The average value $X_{AVR}$ can be computed in the average value processor shown in FIG. 4. According to the algorithm implemented by this processor, the latest sample $|x_{i+n+1}|$ is added to the contents of the AVR register 401 and the "oldest" sample $|x_i|$ is subtracted. Both of these samples are first converted in an A-law linear converter 402 and temporarily stored in the shift registers 403 and 404, respectively. Then, in one continuous serial operation the arithmetic unit 405 adds the value $|x_{i+n+1}|$ to and subtracts the value $|x_i|$ from the contents of the AVR register 401. The converter 402 also converts every sample $|x_{i+1}|$ to $|x_{i+n+1}|$ into a linear format, and then the samples are compared in a digital comparator 406, (corresponding to comparator 208) with the stored average value $X_{AVR}$ in the AVR register 401. If the sample is greater than $X_{AVR}$ in register 401, the signal $\phi_j$ enables the correction process, i.e., to add or subtract the correction $\Delta H$ to the existing value $h_i$. The new value is then stored in the H-register 216. The average value $X_{AVR}$ in AVR register 401 is also converted in digital-to-analog converter 407 (corresponding to converter 210) into a reference voltage $V_{REF}$ for the analog comparator 212 and the adaptive center clipper 211.

In the alternative, the pseudo rms value $X_j$ (see Equation (27) can be computed. Instead of squaring, adding and taking the square root, approximations and a new algorithm are used.

Figure 5:
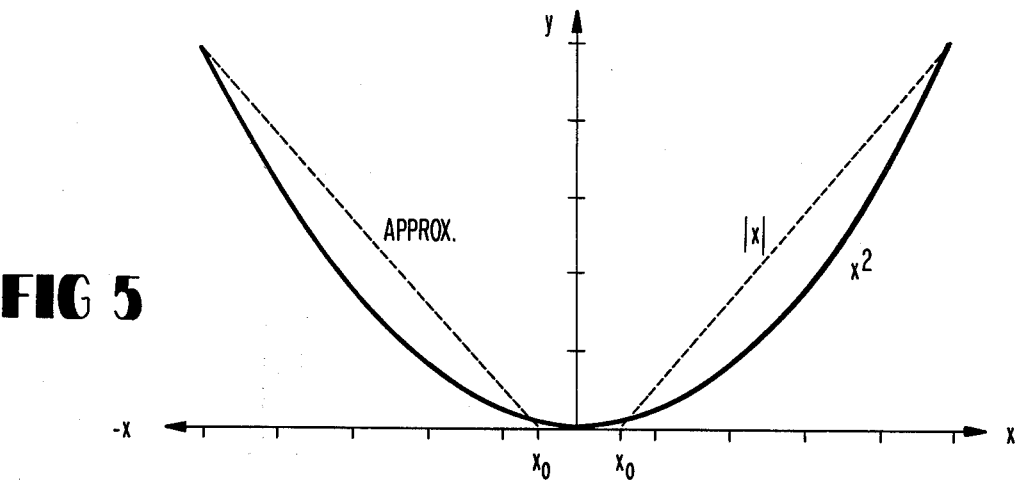
FIGS. 5 and 6 are graphs showing the approximations of $y = x^2$ and $z = \sqrt{y}$, respectively, used in the digital root mean square processor according to an alternative embodiment of the invention.
Figure 6:
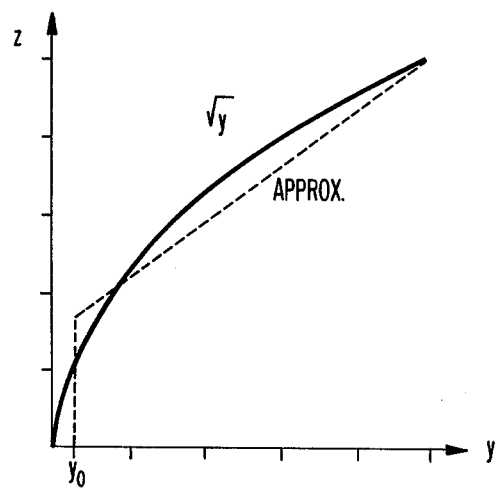

For the parabola $X_{i+j}^2$ a 3-segment linear approximation as illustrated in FIG. 5 may be used, i.e., $$\frac{1}{n} \sum_{i=0}^{n} X_{i+j}^2 \doteq \frac{1}{n} \sum_{i=0}^{n} \Phi(X_{i+j}) \quad (28)$$

where
$\Phi(X_{i+j}) = 0$, for $|X_{i+j}| < X_0$ $\Phi(X_{i+j}) = a |X_{i+j}| - b$, elsewhere $\quad (29)$ and $a$ and $b$ are constants. A similar 2-segment approximation may be used for the square root function as shown in FIG. 6.

Figure 7:
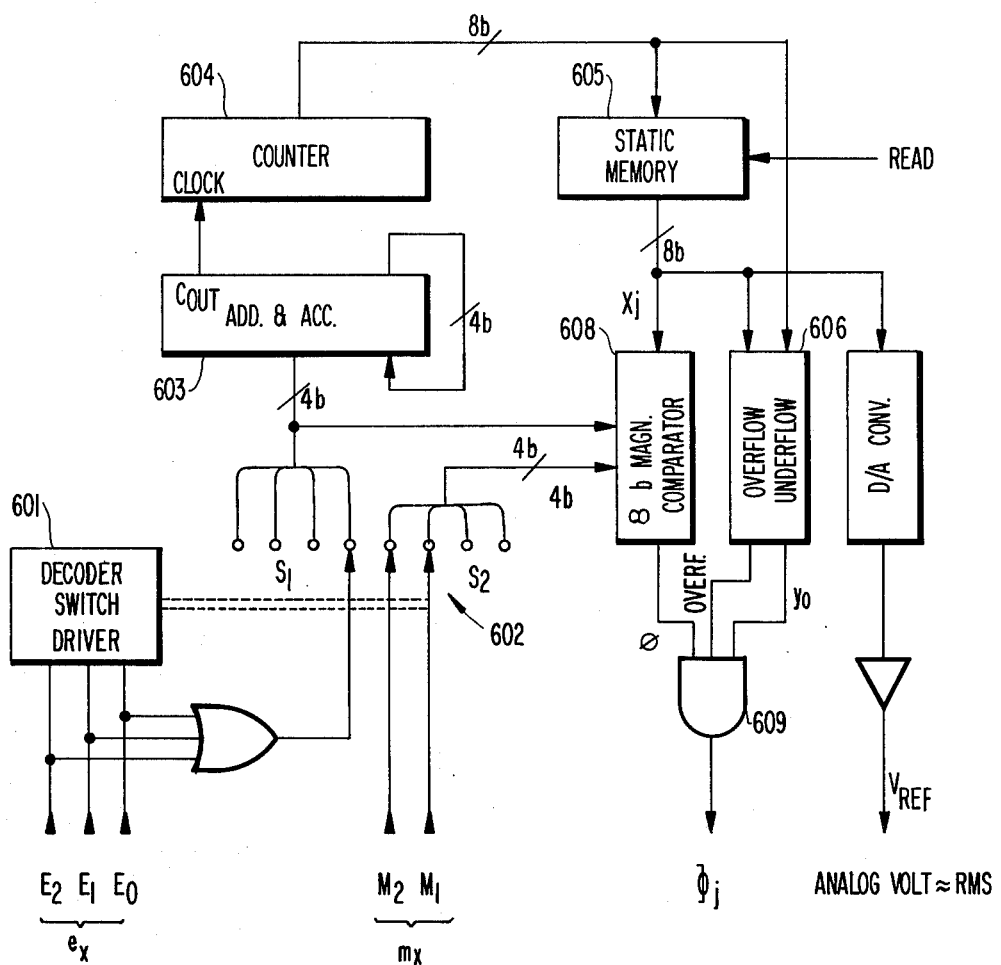
FIG. 7 is a block diagram of the digital root mean square processor which forms part of the cross-correlator used in the alternative embodiment of the system shown in FIG. 2.

The whole circuit for generation of $X_j$, $\Delta_j$ and the reference voltage $V_{REF}$ is shown in FIG. 7. Only the 3-bit exponent $e_x$ and the two successively higher significant bits ($M_2$, $M_1$) of mantissa $m_x$ of the (A-law encoded)

sample $x_{i+j}$ enter the decoder 601 and static shift register 602, respectively. This digital signal is converted to 8-bit linear format according to Equations (12) and (13), i.e., by shifting $(1 + m_x)$ by $e_x$ binary places with the static shift register 602 schematically illustrated by the switches $S_1 + S_2$. From this 8-bit linear format, only the four most significant bits are added to the 4-bit accumulator 603; hence, the function $\phi(X_{i+j})$ according to Equation (28) is generated. The number of accumulator overflows ($C_{out}$) are counted by a binary counter 604 whose number of stages is chosen according to the number $n$ of bits stored in the X-register 206. Hence, the approximate sum of $n$-samples and also the division by $n$ is performed (see Equation (27)). At the end of the convolution cycle, the eight significant bits of $X_j$ are stored in a static memory 605. This stored signal drives the overflow/underflow detector 606 which inhibits the cross-correlator during a strong signal which has different statistical properties than speech (e.g., burst noise) and when the stored signal is below threshold $y_o$ (see FIG. 6). It is also converted to the reference voltage $V_{REF}$ by digital-to-analog converter 607 (corresponding to converter 208).

In the following convolution cycle every $x_{i+j}$ sample entering the pseudo rms processor is compared with the stored value $X_j$ in an 8-bit digital comparator 608 (corresponding to comparator 208) and so the cross-correlator function $\phi_j$ is generated (Equation (13)). The three inhibit signals $\phi m$ $Y_o$ and overflow are combined in an AND gate 609 into $\phi_j$ which controls the $\Delta h_{i,j}$ adder 209.

It will be apparent that the embodiment shown is only exemplary and that various modifications can be made in construction and arrangement within the scope of the invention as defined in the appended claims.

What is claimed is:

1. A digital echo canceller for use in long distance telephone circuits of the type having means for storing a fixed number of most recent samples $x_1, \ldots, x_i, \ldots, x_n$ of a received signal, means for storing a corresponding fixed number of estimated impulse response coefficients $h_1, \ldots, h_i, \ldots, h_n$, digital convolution means responsive to said stored samples and said stored coefficients for generating an approximate echo signal, means for subtracting said approximate echo signal from a real echo signal thereby producing a difference signal corresponding to residual echo, and cross-correlation means responsive to said residual echo and said stored samples for updating said stored coefficients respectively, the improvement wherein said stored samples and said stored coefficients are encoded in a logarithmic format having sign, exponent and mantissa, said digital convolution means comprises means for multiplying by the addition of the logarithms of said stored samples and said stored coefficients, means for accumulating the products generated by said multiplying means, and means for converting the value of the accumulated products to an analog signal representing said approximate echo signal, said analog signal being analogically subtracted in said means for subtracting.

2. A digital echo cancellor as recited in claim 1, wherein said means for multilying in said convolution means comprises:

a first multiplier for multiplying the mantisssa of said stored samples and said stored coefficients to generate a partial product, said partial product forming the product which is accumulated in said means for accumulating when the exponent of said stored samples and the exponent of said stored coefficients are both zero, a first adder for adding the mantissa having the zero exponent to said partial product generated by said first multiplier when one or the other but not both exponents of said stored samples and said stored coefficients are zero, the output of said first adder forming the product which is accumulated in said means for accumulating, a second adder for adding the exponents of said stored samples and said stored coefficients when both said exponents are non-zero, and a second multiplier responsive to the output of said second adder for multiplying said partial product by a function of the output of said second adder, the output of said second multiplier forming the product which is accumulated in said means for accumulating.

3. A digital echo cancellor as recited in claim 1, wherein said cross-correlation means comprises:

means for comparing said difference signal from said means for subtracting with a reference and producing a quantized signal $\Delta H$ corresponding to the mantissa of a correction to that stored coefficient, means for generating an average value $X_{AVR}$ of said stored samples, and means controlled by said average value generating means for multiplying said stored coefficient by a multiplier by the addition of the logarithm of said stored coefficient and the logarithm of one plus or minus the quantized signal from said means for comparing.

4. A digital echo canceller as recited in claim 3 further comprising a digital to analog converter connected to said means for generating an average value for converting the digital value of the average value $X_{AVR}$ to an analog voltage, said analog voltage being supplied to said means for comparing as said reference.

5. A digital echo canceller as recited in claim 4 further comprising an analog center clipper connected to the output of said means for subtracting, said center clipper having a variable bias controlled by the analog voltage from said digital to analog converter.

6. A digital echo canceller as recited in claim 3, wherein said means for generating an average value comprises:

an average value register, first and second shift registers for storing the latest sample $|x_{i+n+1}|$ and the "oldest" sample $|x_i|$, respectively, and arithmetic means connected to said average value register and said first and second shift registers for adding the value $|x_{i+n+1}|$ to and subtracting the value $|x_i|$ from the contents of said average value register and storing the result in said average value register.

7. A digital echo canceller as recited in claim 1, wherein said cross-correlation means comprises:

means for comparing said difference signal from said means for subtracting with a reference and producing a quantized signal $\Delta H$ corresponding to the mantissa of a correction to that stored coefficient, means for generating a pseudo rms value $X_{RMS}$ of said stored samples, and means controlled by said pseudo rms value generating means for multiplying said stored coefficient by a multiplier by the addition of the logarithm of said stored coefficient and the logarithm of one plus or minus the quantized signal from said means for comparing.

8. A digital echo canceller as recited in claim 7 further comprising a digital to analog converter connected to said means for generating a pseudo rms value for converting the digital value of the pseudo rms $X_{RMS}$ value to an analog voltage, said analog voltage being supplied to said means for comparing as a reference.

9. A digital echo cancellor as recited in claim 8 further comprising an analog center clipper connected to the output of said means for subtracting, said center clipper having a variable bias controlled by the analog voltage from said digital to analog converter.

10. A digital echo canceller as recited in claim 9 wherein said means for generating a pseudo rms value comprises:
a pseudo rms value register,
accumulator means for adding and accumulating each sample $|x_{i+j}|$ exceeding a predetermined absolute value every $j$th sampling period, and
counter means connected to count the overflow from said accumulator means, the contents of said counter means being stored in said pseudo rms register at the end of each sampling period.

11. A digital echo canceller as recited in claim 1, further comprising an analog center clipper connected to the output of said means for subtracting, said center clipper having a variable bias controlled by said cross-correlation means.

12. A pseudo rms value circuit comprising:
means for receiving a plurality of digital signals,
a pseudo rms value register,
accumulator means for adding and accumulating each digital signal having a value exceeding a predetermined absolute value, and
counter means connected to count the overflows from said accumulator means, the contents of said counter means being stored in said pseudo rms value register.

* * * * *

UNITED STATES PATENT AND TRADEMARK OFFICE
CERTIFICATE OF CORRECTION

PATENT NO. : 4,064,379

DATED : December 20, 1977

INVENTOR(S) : Otakar Anthony HORNA

It is certified that error appears in the above-identified patent and that said Letters Patent are hereby corrected as shown below:

Column 1, line 15 - "a echo" should be -- an echo -- line 58 - delete "roudtrip" insert -- roundtrip --

Column 4, line 54 - delete "[" (second occurrence) insert --]--

Column 5, line 42 - delete "$h^i_j$" insert -- $h^i_i$ --

Column 6, line 67 - delete "averae" insert -- average --

Column 8, line 49 - delete "of" (third occurrence)

line 68 - delete "rj" insert -- $r_j$ --

UNITED STATES PATENT AND TRADEMARK OFFICE
CERTIFICATE OF CORRECTION

PATENT NO. : 4,064,379

DATED : December 20, 1977

INVENTOR(S) : Otakar Anthony HORNA

It is certified that error appears in the above-identified patent and that said Letters Patent are hereby corrected as shown below:

Column 9, line 5 - delete "$h_i.$" insert -- $h_i^\cdot$ -- line 15 - delete "$\begin{vmatrix}x\\h\end{vmatrix}$" insert -- $\begin{vmatrix}x\\h\end{vmatrix}$ -- line 23 - delete "$\begin{vmatrix}x\\h\end{vmatrix}$" insert -- $\begin{vmatrix}x\\h\end{vmatrix}$ -- line 58 - delete "(1+m)" insert -- $(1+m_h)$ --

Column 10, line 7 - delete "$E_1$" and "$M_1$" and insert -- $E_i$ -- $M_i$ -- line 34 - delete "transistortransistor" and insert -- transistor-transistor --

UNITED STATES PATENT AND TRADEMARK OFFICE
CERTIFICATE OF CORRECTION

PATENT NO. : 4,064,379

DATED : December 20, 1977

INVENTOR(S) : Otakar Anthony HORNA

It is certified that error appears in the above-identified patent and that said Letters Patent are hereby corrected as shown below:

Column 10, line 62 - delete "$e_{h\varepsilon\{}$" insert -- $e_h \varepsilon \{$ --

Column 11, line 4 - delete comma before the Equation line 4 - delete " . " insert -- $\cdot$ -- line 6 - after "12)" insert -- ) -- line 6 - delete "$< 1$" insert -- $\ll 1$ -- line 9 - delete comma before the Equation line 15 - delete comma before the Equation line 15 - delete " $|h_i|$ " insert -- $|h_i|$ --

UNITED STATES PATENT AND TRADEMARK OFFICE
CERTIFICATE OF CORRECTION

PATENT NO. : 4,064,379
DATED : December 20, 1977
INVENTOR(S) : Otakar Anthony HORNA It is certified that error appears in the above-identified patent and that said Letters Patent are hereby corrected as shown below:

Column 11, line 20 - delete comma before the Equation line 21 - delete "$<1$ or $<1$" insert -- $>1$ or $<1$ -- line 25 - delete comma before the Equation line 44 - delete comma before the Equation line 54 - delete "as" and insert -- has -- line 67 - delete "cancellor" insert -- canceller --

Column 12, line 49 - after "(27)" insert -- ) -- line 52 - delete "$X_{i+j}{}^2$" insert -- $X^2_{i+j}$ --

UNITED STATES PATENT AND TRADEMARK OFFICE
CERTIFICATE OF CORRECTION

PATENT NO. : 4,064,379

DATED : December 20, 1977

INVENTOR(S) : Otakar Anthony HORNA

It is certified that error appears in the above-identified patent and that said Letters Patent are hereby corrected as shown below:

IN THE CLAIMS:

Column 13, line 61 - delete "cancellor" insert -- canceller --

Column 14, line 19 - delete "cancellor" insert -- canceller --

Column 15, line 9 - delete "cancellor" insert -- canceller --

Column 16, line 1 - delete "overflow" insert -- overflows --

Signed and Sealed this

Twenty-sixth Day of September 1978

[SEAL]

Attest:

RUTH C. MASON
Attesting Officer

DONALD W. BANNER
Commissioner of Patents and Trademarks